(12) United States Patent
Ueno (10) Patent No.: US 9,586,577 B2
(45) Date of Patent: Mar. 7, 2017

(54) CONTROL DEVICE FOR VEHICLE AND CONTROL METHOD FOR VEHICLE

(71) Applicant: Ayumu Ueno, Toyota (JP)

(72) Inventor: Ayumu Ueno, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 983 days.

(21) Appl. No.: 13/828,067

(22) Filed: Mar. 14, 2013

(65) Prior Publication Data

US 2013/0253806 A1     Sep. 26, 2013

(30) Foreign Application Priority Data

Mar. 26, 2012    (JP) ................................ 2012-068915

(51) Int. Cl.
    *B60W 20/00*        (2016.01)
    *B60W 10/06*        (2006.01)
    *F02N 11/08*         (2006.01)

(52) U.S. Cl.
    CPC .......... *B60W 20/108* (2013.01); *B60W 10/06* (2013.01); *B60W 20/15* (2016.01); *B60W 20/40* (2013.01); *B60W 2520/10* (2013.01); *B60W 2540/106* (2013.01); *F02N 11/0822* (2013.01); *F02N 11/0833* (2013.01); *F02N 11/0844* (2013.01); *F02N 2200/101* (2013.01); *Y02T 10/48* (2013.01)

(58) Field of Classification Search
    CPC .. F02N 11/08; F02N 11/0803; F02N 11/0814; F02N 11/0818; F02N 11/0822; F02N 11/0833; F02N 11/0844; F02N 2200/0801; F02N 2200/101
See application file for complete search history.

(56) References Cited

U.S. PATENT DOCUMENTS

| | | | |
|---|---|---|---|
| 2002/0019687 A1* | 2/2002 | Suzuki | B60K 6/48 701/22 |
| 2004/0127326 A1 | 7/2004 | Tajima et al. | |
| 2007/0078040 A1* | 4/2007 | Nobumoto | B60W 10/06 477/70 |
| 2007/0204840 A1* | 9/2007 | Abe | F02D 41/1494 123/697 |
| 2010/0050970 A1* | 3/2010 | Okumoto | F02N 11/0844 123/179.4 |
| 2010/0228461 A1* | 9/2010 | Sugai | B60K 6/445 701/101 |

(Continued)

FOREIGN PATENT DOCUMENTS

| | | |
|---|---|---|
| JP | 2002-047963 A | 2/2002 |
| JP | 2004-092623 A | 3/2004 |

(Continued)

*Primary Examiner* — Erick Solis
*Assistant Examiner* — Anthony L Bacon
(74) *Attorney, Agent, or Firm* — Dinsmore & Shohl LLP (57) ABSTRACT

A control device for a vehicle includes a drive system that outputs a driving force for a vehicle. The control device further includes an accelerator operation section which operates an accelerator, and a control section that is configured to control the driving force output by the drive system, in accordance with an operation amount of the accelerator operated by the accelerator operation section. The control section is configured to start the drive system if a change in the operation amount of the accelerator is detected.

10 Claims, 7 Drawing Sheets

(56) References Cited

U.S. PATENT DOCUMENTS

| | | |
|---|---|---|
| 2011/0136622 A1 | 6/2011 | Enoki |
| 2011/0270512 A1* | 11/2011 | Hayashi .............. F02N 11/0844 |
| | | 701/112 |
| 2012/0172175 A1* | 7/2012 | Nedorezov ........... F02D 41/065 |
| | | 477/169 |
| 2013/0166173 A1* | 6/2013 | Ideshio ................ B60W 20/00 |
| | | 701/103 |

FOREIGN PATENT DOCUMENTS

| | | |
|---|---|---|
| JP | 2004-211605 A | 7/2004 |
| JP | 2007-023919 A | 2/2007 |
| JP | 2008-232110 A | 10/2008 |
| JP | 2011-117531 A | 6/2011 |

* cited by examiner

CONTROL DEVICE FOR VEHICLE AND CONTROL METHOD FOR VEHICLE

INCORPORATION BY REFERENCE

The disclosure of Japanese Patent Application No. 2012-068915 filed on Mar. 26, 2012 including the specification, drawings and abstract is incorporated herein by reference in its entirety.

BACKGROUND OF THE INVENTION

1. Field of the Invention

The present invention relates to a control device for a vehicle and a control method for a vehicle that enable prompt starting.

2. Description of Related Art

Hybrid vehicles have been known in which an engine and a motor are mounted as drive sources. Here, the engine is an internal combustion engine or the like. An electric storage device is mounted in the hybrid vehicle. The electric storage device is a battery or the like. The electric storage device stores electric power that is supplied to the motor. The battery is charged with the electric power generated by a generator, the electric power regenerated by the motor, and the like. The generator is driven by the engine. The electric power is regenerated during deceleration of the vehicle.

In a plug-in hybrid vehicle, the battery is charged with the electric power that is supplied from the outside of the hybrid vehicle. Then, the plug-in hybrid vehicle uses the charged electric power. The plug-in hybrid vehicle is a type of hybrid vehicle. Also, an electric vehicle that has the motor as the primary drive source has been known. These vehicles may hereinafter be referred to as electric motor vehicles.

In the vehicle that travels by using the engine as the primary drive source, the engine can be started by cranking when the engine stops during traveling. At this time, a shift position of an automatic transmission is set in a parking range or a neutral range. The parking range may hereinafter be referred to as a P-range. The neutral range may hereinafter be referred to as an N-range.

A following control device is disclosed in Japanese Patent Application Publication No. 2004-092623 (JP 2004-092623 A). It is a control device that permits cranking in response to a user's request to start the engine even when a shift range other than the P-range or the N-range is selected.

However, in such a control device for a vehicle, a process to restart the engine from the time when the engine stops to the time when the engine is restarted in response to the user's request to start the engine is complicated.

Even a regular starting process may be complicated during traveling. The regular starting process refers to an operation to press a start switch while a brake pedal is being depressed. Therefore, it has been difficult to promptly start traveling again.

In addition, in some of the electric motor vehicles, a drive system stops by an erroneous operation of the start switch during traveling.

SUMMARY OF THE INVENTION

The present invention provides a control device for a vehicle and a control method for a vehicle that reflect a starting request of a user to processing to start a drive system and resume the system promptly.

The control device for a vehicle according to a first aspect of the present invention is a control device for a vehicle that controls a drive system. The control device comprises a drive system that outputs a driving force for a vehicle, an accelerator operation section which operates an accelerator, and a control section that is configured to control the driving force output by the drive system, in accordance with an operation amount of the accelerator operated by the accelerator operation section. The control section is configured to start the drive system if a change in the operation amount of the accelerator is detected.

A control method for a vehicle according to a second aspect of the present invention detects that a drive system stops during traveling of a vehicle, detects an accelerator operation amount, reads out a threshold map that is set in advance and shows a relation between a traveling speed of the vehicle and the accelerator operation amount, determines whether or not the accelerator operation amount is in a predetermined region that is set in advance in the threshold map, and restarts the drive system if the accelerator operation amount is in the predetermined region that is shown in the threshold map.

According to the first and second aspects of the present invention, the drive system is started when the change in the operation amount of the accelerator is detected.

As described above, a restarting request made by the user through the accelerator operation section is reflected to processing to start the drive system. Therefore, the system can be resumed promptly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on an embodiment of the present invention with reference to drawings. In the description below, same components are denoted with same reference numerals. Names and functions thereof are also the same. Therefore, descriptions thereof are not repeated.

Figure 1:
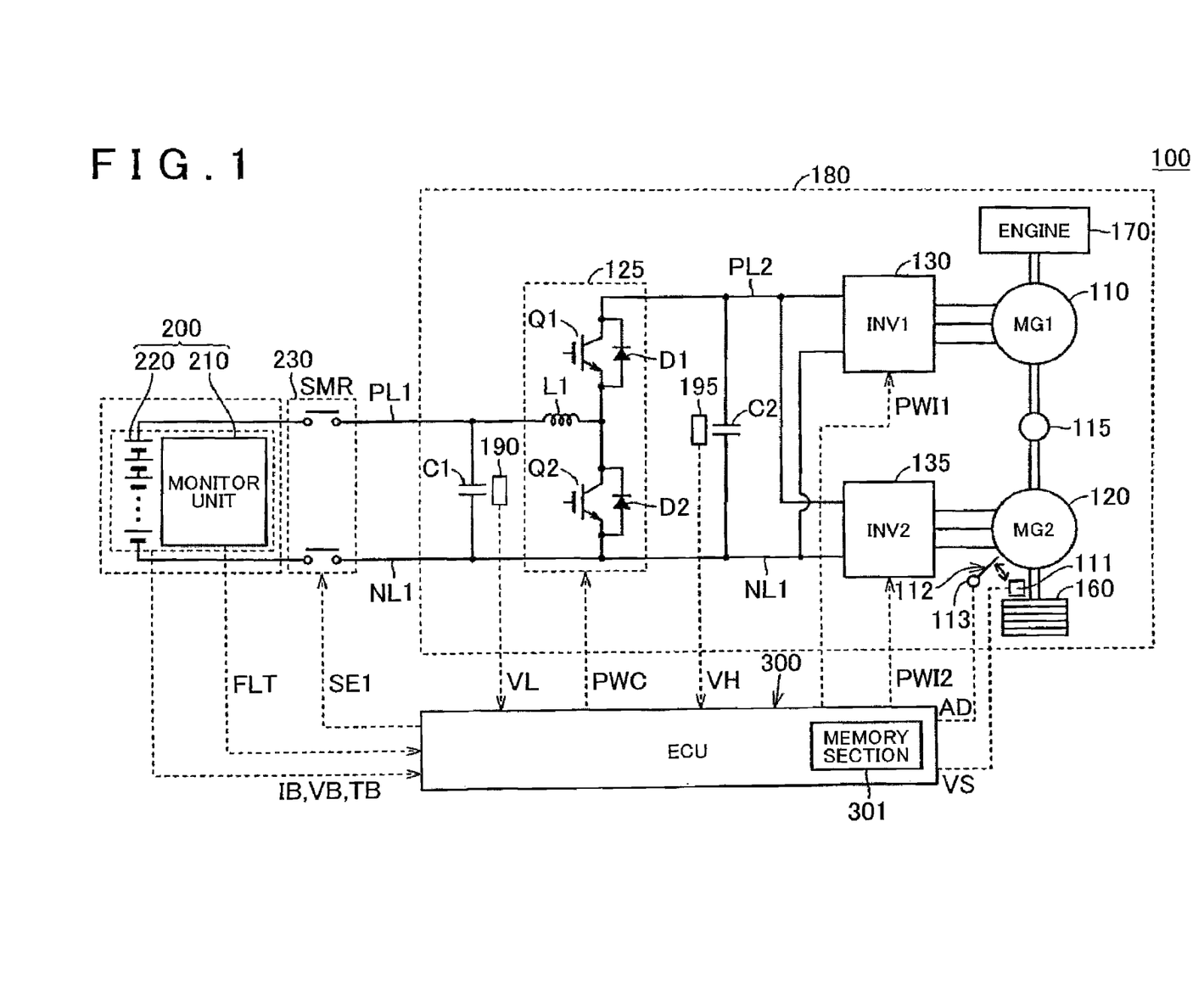
FIG. 1 is a general block diagram of a hybrid vehicle that includes an electric power system according to an embodiment.

FIG. 1 is a general block diagram of a hybrid vehicle 100. The hybrid vehicle 100 includes an electric power system according to the embodiment.

A description will hereinafter be made with reference to FIG. 1. The hybrid vehicle 100 includes an electric storage device 220, a system main relay (SMR) 230, a loading device 180, a monitor unit 210, and an electronic control unit (ECU) 300. The ECU 300 is a control device. A drive system according to the embodiment is primarily constructed from the loading device 180, the electric storage device 220, the ECU 300, and the like.

The loading device 180 includes a converter 125, inverters 130, 135, motor generators 110, 120, a power transmission gear 115, a drive wheel 160, an engine 170, voltage sensors 190, 195, and capacitors C1, C2. The voltage sensors 190, 195 are voltage detecting sections.

The electric storage device 220 is an electric power storage element. The electric storage device 220 can charge and discharge the electric power. The electric storage device 220 includes a secondary battery and an electric storage element, for example. The secondary battery is a lithium-ion battery, a nickel-metal hydride battery, a lead storage battery, or the like. The electric storage element is an electric double layer capacitor.

The electric storage device 220 is connected to the converter 125 through electric power lines PL1, NL1. The electric storage device 220 is charged with the electric power that is generated by the motor generators 110, 120. Power output of the electric storage device 220 is approximately 200V, for example.

The monitor unit 210 has a function to monitor the electric storage device 220. For example, the monitor unit 210 is provided in a battery pack 200. In this case, the monitor unit 210 is provided together with the electric storage device 220. The monitor unit 210 detects input/output current IB of the electric storage device 220, a direct current voltage VB of the electric storage device 220, and a temperature TB of the electric storage device 220. Then, the monitor unit 210 sends detected values to the ECU 300.

In addition, the monitor unit 210 sends a failure signal FLT to the ECU 300 in a particular case. The particular case refers to a case when the monitor unit 210 itself fails or a case when abnormality of the electric storage device 220 is detected. The failure signal FLT indicates these failures.

The SMR 230 includes a first relay and a second relay. The first relay is connected between a positive terminal of the electric storage device 220 and the electric power line PL1. The second relay is connected between a negative terminal of the electric storage device 220 and the electric power line NL1. The SMR 230 is controlled by a control signal SE1 from the ECU 300. The SMR 230 switchably supplies and cuts off the electric power between the electric storage device 220 and the loading device 180.

The condenser C1 is connected between the electric power line PL1 and the electric power line NL1. The condenser C1 reduces variations in voltage between the electric power line PL1 and the electric power line NL1. The voltage sensor 190 detects a direct current voltage VL that is applied to the condenser C1. Then, the voltage sensor 190 sends a detected value to the ECU 300.

The converter 125 includes switching elements Q1, Q2, antiparallel diodes D1, D2, and a reactor L1.

The switching elements Q1, Q2 are connected between an electric power line PL2 and the electric power line NL1. At this time, the switching elements Q1, Q2 are connected each other in a forward direction that is headed from the electric power line PL2 to the electric power line NL1. Also, the switching elements Q1, Q2 are connected in series. In this embodiment, an insulated gate bipolar transistor (IGBT), a power metal oxide semiconductor (MOS) transistor, a power bipolar transistor, or the like may be used as the switching element.

The antiparallel diode D1 is connected to the switching element Q1. The antiparallel diode D2 is connected to the switching element Q2. The reactor L1 is provided between the electric power line PL1 and a connection node between the switching elements Q1, Q2.

The switching elements Q1, Q2 are controlled by a control signal PWC from the ECU 300. The switching elements Q1, Q2 converts the voltage between the electric power lines PL1, NL1 and the electric power lines PL2, NL1.

Basically, the converter 125 is controlled such that the switching elements Q1, Q2 are complimentarily and alternatively turned on and off within each switching cycle. During a voltage increasing operation, the converter 125 increases the direct current voltage VL to a direct current voltage VH.

This voltage increasing operation is conducted by supplying electromagnetic energy to the electric power line PL2 through the switching element Q1 and the antiparallel diode D1. This electromagnetic energy is stored in the reactor L1 while the switching element Q2 is ON.

In addition, during a voltage decreasing operation, the converter 125 decreases the direct current voltage VH to the direct current voltage VL. This voltage decreasing operation is conducted by supplying the electromagnetic energy to the electric power line NL1 through the switching element Q2 and the antiparallel diode D2. This electromagnetic energy is stored in the reactor L1 while the switching element Q1 is ON.

A voltage conversion ratio in the voltage increasing operation and the voltage decreasing operation is controlled by a ratio of ON periods of the switching elements Q1, Q2 in the above switching cycle. The voltage conversion ratio refers to a ratio of VH to VL. The ratio of the ON period is a duty ratio.

When the voltage increasing operation and the voltage decreasing operation are unnecessary, the conversion ratio=1.0. More specifically, when the voltage increasing operation and the voltage decreasing operation are unnecessary, VH=VL. When the voltage conversion ratio=1.0, the duty ratio=100%. In order to set the conversion ratio=1.0, the control signal PWC is set such that the switching element Q1 is kept in an ON state. Also, the control signal PWC is set such that the switching element Q2 is kept in an OFF state.

The condenser C2 is connected between the electric power line PL2 and the electric power line NL1. The electric power lines NL1, PL2 connect the converter 125 to the inverters 130, 135. The condenser C2 reduces the voltage variation between the electric power line PL2 and the electric power line NL1. The voltage sensor 195 detects the direct current voltage VH that is applied to the condenser C2. Then, the voltage sensor 195 sends a detected value to the ECU 300.

The inverter 130 and the inverter 135 are connected in parallel with respect to the converter 125 by the electric power lines PL2, NL1. The inverter 130 is controlled by a control command PW11 from the ECU 300. The inverter 135 is controlled by a control command PW12. The inverters 130, 135 convert direct current to alternating current. This direct current is output from the converter 125. The alternating current converted by the inverter 130 drives the motor generator 110. The alternating current converted by the inverter 135 drives the motor generator 120.

The motor generators 110, 120 are alternating-current rotary electric machines. For example, the motor generators 110, 120 are permanent magnet synchronous motors. This permanent magnet synchronous motor includes a rotor in which a permanent magnet is embedded, for example.

Output torques of the motor generators 110, 120 are transmitted to the drive wheel 160 through the power transmission gear 115. The power transmission gear 115 is constructed from a reduction gear and a power division mechanism.

The hybrid vehicle 100 travels by using the transmitted torque. The motor generators 110, 120 can generate the electric power from a rotational force of the drive wheel 160 during a regenerative braking operation of the hybrid vehicle 100.

Then, the inverters 130, 135 convert the generated electric power to the electric power that is charged in the electric storage device 220.

In addition, the motor generators 110, 120 are coupled to the engine 170 through the power transmission gear 115.

The ECU 300 cooperatively operates the motor generators 110, 120 and the engine 170. This produces a vehicle driving force that is necessary to run the hybrid vehicle 100. Furthermore, the motor generators 110, 120 can generate the electric power from rotation of the engine 170. Thus generated electric power can be used to charge the electric storage device 220.

In this embodiment, the motor generator 120 is primarily used as a motor. The motor generator 120 provides the drive wheel 160 with a rotational driving force. The motor generator 110 is primarily used as a generator. The motor generator 110 is rotationally driven by the engine 170.

The ECU 300 includes a central processing unit (CPU), a memory, and an input/output buffer. The CPU, the memory, and the input/output buffer are not shown in FIG. 1. The ECU 300 receives a signal from each sensor and the like. The ECU 300 also sends the control signal to each of equipment. In addition, the ECU 300 controls the hybrid vehicle 100. The ECU 300 also controls each of the equipment. These controls are not limited to processing by software. These controls can also be processed by hardware. The hardware of this kind is an electronic circuit.

The ECU 300 receives the various detected values from the monitor unit 210. The various detected values include the detected values of the input/output current IB, the direct current voltage VB, and the temperature TB. Based on these pieces of information, the ECU 300 computes a charging state of the electric storage device 220. The charging state of the electric storage device 220 may hereinafter be referred to as a state of charge (SOC).

The ECU 300 may adopt a configuration in which a control device is provided for each function or each of the equipment to be controlled. The control devices for the loading device 180 and for the electric storage device 220 have such configuration.

The ECU 300 detects abnormality in the direct current voltage VL by the voltage sensor 190. The ECU 300 also detects abnormality in the electric storage device 220. Detecting the abnormality in the electric storage device 220 will be described later.

A vehicle speed sensor 111 is connected to the ECU 300. The vehicle speed sensor 111 detects a rotational speed of a drive shaft and the like. The drive shaft rotatively supports the drive wheel 160. The vehicle speed sensor 111 sends a vehicle speed signal VS to the ECU 300 according to a traveling speed.

An accelerator operation amount sensor 113 is connected to the ECU 300. The accelerator operation amount sensor 113 is provided in an accelerator operation section 112. The accelerator operation section 112 includes an accelerator pedal. The accelerator operation amount sensor 113 detects an accelerator operation amount from a turning angle of the accelerator pedal.

The accelerator operation amount sensor 113 sends information on a detected accelerator operation amount AD to the ECU 300. The ECU 300 uses the accelerator operation amount AD as vehicle information that corresponds to a user's acceleration request.

Figure 2:
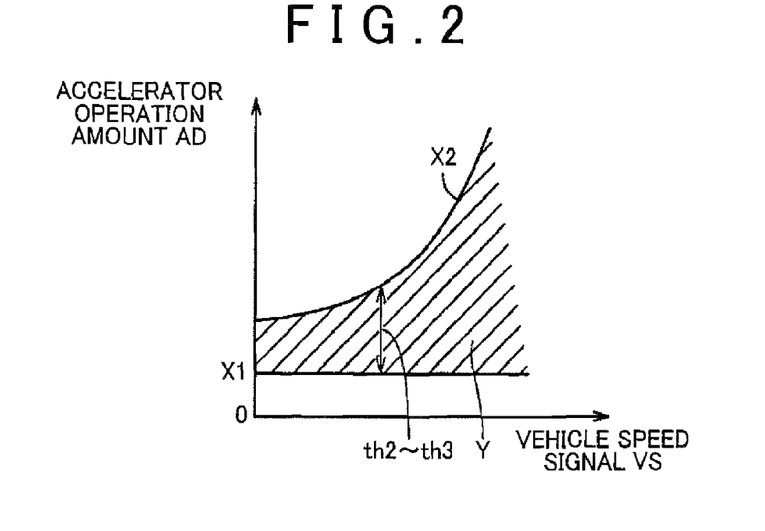
FIG. 2 is a graph in which a region Y for restarting an engine is mapped according to a relation between a vehicle speed signal VS that is sent from a vehicle speed sensor and an accelerator operation amount AD.

FIG. 2 is a graph in which a region Y is mapped according to a relation between the vehicle speed signal VS and the accelerator operation amount AD. The vehicle speed signal VS is sent from the vehicle speed sensor. The region Y is a region in which the engine 170 can be started.

In this FIG. 2, the region Y is located between a lower threshold function X1 (VS) and an upper threshold function X2 (VS). In the region Y, the engine 170 can be started.

The lower threshold function X1 (VS) does not change even when the vehicle speed signal VS increases. That is, the lower threshold function X1 (VS) is a constant threshold th2. The ECU 300 does not start the engine 170 until the accelerator operation amount AD exceeds the threshold th2 of the lower threshold function X1 (VS).

Accordingly, it is possible by changing the threshold th2 to adjust size of a dead region that corresponds to an amount of play of the accelerator operation section 112.

The upper threshold function X2 (VS) is a monotonically increasing function. The upper threshold function X2 (VS) increases with the increase in the vehicle speed signal VS. The ECU 300 does not start the engine 170 when the accelerator operation amount AD exceeds a threshold th3 of the upper threshold function X2 (VS).

For example, when the traveling speed is 0 km/h (the vehicle speed signal VS=0) and the accelerator operation amount AD exceeds the threshold th3, the ECU 300 prohibits starting of the engine 170.

Accordingly, a drive torque in a vehicle traveling direction that is applied to the drive wheel 160 does not increase abruptly from a state that the hybrid vehicle 100 is stopped.

As described above, the ECU 300 determines whether or not the detected accelerator operation amount AD is located in the region Y. The region Y refers to a region between the lower threshold function X1 (VS) and the upper threshold function X2 (VS).

The ECU 300 determines the accelerator operation amount AD as described above. The ECU 300 starts the drive system when determining that the engine 170 can be started.

Width of the region Y that allows restarting of the engine is set to gradually increase with the increase in the vehicle speed signal VS. In other words, width between the thresholds th2 and th3 gradually increases with the increase in the vehicle speed signal VS.

Therefore, it has been known that behavior of the hybrid vehicle 100 is not significantly influenced during traveling even if the drive torque increases when the drive system is restarted. A condition to start the drive system is gradually relaxed as the vehicle speed signal VS increases.

In this embodiment, the region Y is expanded with the increase in the vehicle speed in a range wherein the vehicle speed signal VS is high. The region Y is a region for the accelerator operation amount AD in which the drive system can be started. The relationship between the accelerator operation amount AD and the vehicle speed signal VS applied to a high-vehicle-speed range is different form that applied to a low-vehicle-speed range. Such relationship between the accelerator operation amount AD and the vehicle speed signal VS is stored in a memory section 301.

The condition to prohibit the starting is relaxed during traveling of the vehicle. Therefore, a possibility to allow the restarting of the drive system increases. The user can easily restart the drive system only by depressing the accelerator pedal during traveling. Accordingly, the user can promptly resume the drive system. The accelerator pedal is included in the accelerator operation section 112.

In this embodiment, the lower threshold function X1 (VS) and the upper threshold function X2 (VS) are stored in advance in the memory section 301 of the ECU 300. The ECU 300 reads out the region Y for the values of the accelerator operation amount AD from the memory section 301 when determining the restarting. Then, the ECU 300 uses the region Y for determination processing. The region Y is defined by the lower threshold function X1 (VS) and the upper threshold function X2 (VS).

Figure 3:
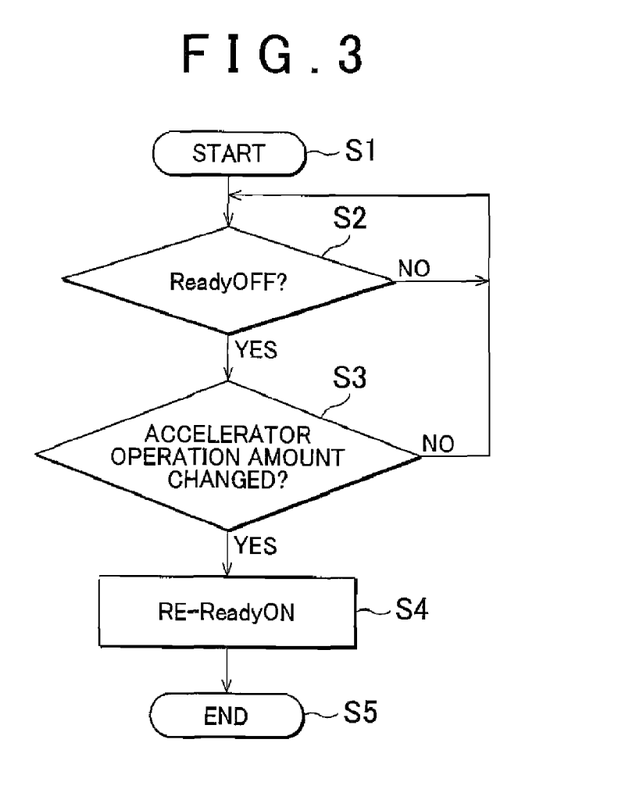
FIG. 3 is a flowchart for describing processing of general starting control according to the embodiment.

FIG. 3 is a flowchart for describing processing of general starting control according to this embodiment.

The ECU 300 determines from the current state of the hybrid vehicle 100 to either conduct Ready-ON control of the drive system or keep the drive system in a Ready-OFF mode. The ECU 300 controls the starting of the drive system for the hybrid vehicle 100.

In addition, the accelerator operation amount sensor 113 detects a depression angle of the accelerator pedal in this starting control. The accelerator operation section 112 includes the accelerator pedal. Then, the accelerator operation amount sensor 113 sends the accelerator operation amount AD to the ECU 300. The ECU 300 starts the drive system according to the change in the accelerator operation amount AD.

First, the ECU 300 of the hybrid vehicle 100 initiates the starting control in a step S1. In a step S2, the ECU 300 determines whether the drive system of the hybrid vehicle 100 is in a Ready-ON mode or the Ready-OFF mode.

If it is determined in the step S2 that the drive system is in the Ready-OFF mode, the ECU 300 proceeds to a next step S3. If it is determined that the drive system is not in the Ready-OFF mode, the ECU 300 returns to the step S2.

The ECU 300 detects the change in the accelerator operation amount AD based on the accelerator operation amount AD detected by the accelerator operation amount sensor 113. Then, the ECU 300 determines the above-detected value in the step S3. If there is a change in the accelerator operation amount AD, the ECU 300 proceeds to a step S4.

If it is determined in the step S3 that the accelerator operation amount AD is not changed, the ECU 300 determines that the user has no intention to keep driving the vehicle. Then, the ECU 300 returns to the step S2.

In the step S4, the ECU 300 conducts re-Ready-ON control of the drive system. Once the drive system is started, the ECU 300 terminates the starting control in a step S5.

In this embodiment, if the accelerator operation amount AD is changed by responding to an increasing request, the ECU 300 can start or restart the drive system even when the hybrid vehicle 100 is stopped. The ECU 300 can also start or restart the drive system even when the drive system is stopped during the traveling of the vehicle if the accelerator operation amount AD is changed by responding to the increasing request. If the accelerator operation amount AD is changed by responding to the increasing request, the ECU 300 determines that the user has an intention to start or keep driving the vehicle.

Therefore, the starting request of the user can directly be reflected to the starting processing or the restarting processing. The user only needs to depress the accelerator pedal in the accelerator operation section 112. Accordingly, the drive system can promptly be resumed to the Ready-ON mode.

Furthermore, a condition to start the drive system while the vehicle is stopped can be added. More specifically, a condition that a brake operation section is depressed or that a shift range is in either a P-range or an N-range can be added. The drive system may not be started if the brake operating section is not operated while the vehicle is stopped. Accordingly, the hybrid vehicle 100 is prevented from the sudden starting or the sudden acceleration.

The ECU 300 of the hybrid vehicle 100 according to this embodiment detects the increase in the accelerator operation amount AD during traveling. Then, the ECU 300 conducts the re-Ready-ON control of the drive system.

Figure 4:
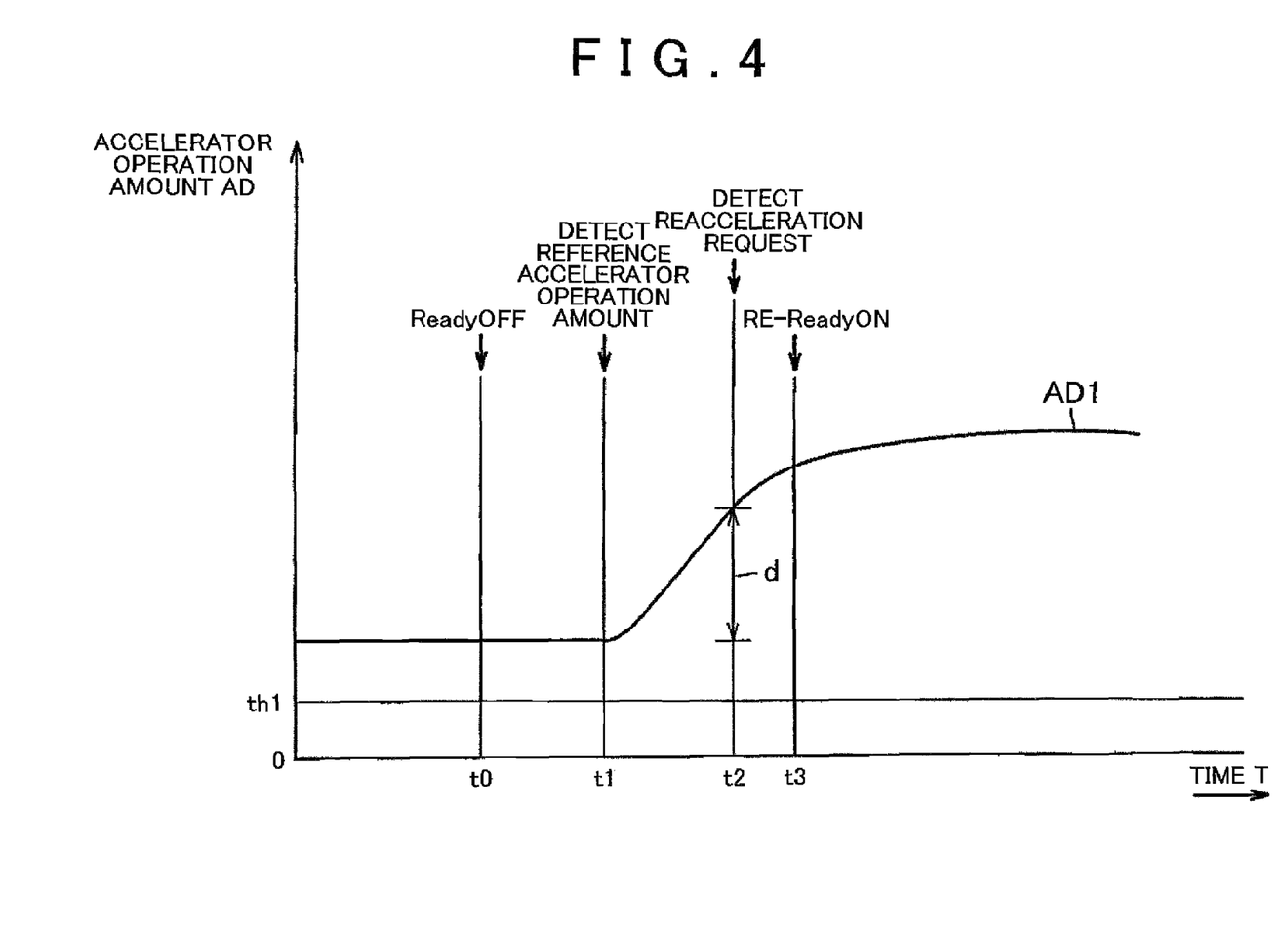
FIG. 4 is a graph that shows how re-Ready-ON control of a drive system is conducted when the accelerator operation amount AD is increased during traveling.

FIG. 4 is a graph that shows how the re-Ready-ON control of the drive system is conducted when the accelerator operation amount AD is increased during traveling of the vehicle.

There is a case where the ECU 300 brings the drive system into the Ready-OFF mode during traveling of the vehicle. Also, there is a case where the ECU 300 stops the engine 170 during traveling of the vehicle. The ECU 300 conducts such controls based on the failure signal FLT from the monitor unit 210 and the like.

When the hybrid vehicle 100 is unintentionally brought into the Ready-OFF mode, the user can make the ECU 300 to conduct the re-Ready-ON control of the drive system. In order to conduct the re-Ready-ON control, the user intentionally increases the accelerator operation amount AD to make the restarting request.

A description will hereinafter be made with reference to FIG. 4. At time to, the ECU 300 conducts the Ready-OFF control. This Ready-OFF control is control unintended by the user. This Ready-OFF control is conducted by stopping the engine 170 or the like during traveling of the vehicle.

At time t1, the ECU 300 uses the accelerator operation amount sensor 113 to detect a reference accelerator operation amount.

A smallest value of the accelerator operation amount AD that is detected in a time period from the Ready-OFF to a time when a reacceleration request is detected is set as the reference accelerator operation amount. The ECU 300 stores the value of this reference accelerator operation amount in the memory section 301. This value is used as a comparative value when a determination on the reacceleration request is made.

At time t2, the ECU 300 detects an accelerator operation amount AD1. The time t2 refers to a time after a specified time period has elapsed since the time t1. The ECU 300 uses the accelerator operation amount sensor 113 to detect the accelerator operation amount AD1. The accelerator operation amount AD1 is an indication of the reacceleration request.

Here, the request to restart the drive system may be detected based on a certain difference "d". As shown in FIG. 4, the difference "d" is a certain difference between the reference accelerator operation amount and the accelerator operation amount AD that is being monitored. The reference accelerator operation amount is detected after the drive system is stopped.

When the difference "d" between the reference accelerator operation amount and the accelerator operation amount AD that is being monitored becomes equal to or greater than a predetermined value, the re-Ready-ON control is conducted. In addition, if the two values of the accelerator operation amount AD1 that are detected at the time t1, t2 differ from each other, the ECU 300 determines that the accelerator operation amount AD has changed. Then, the ECU 300 conducts the re-Ready-ON control.

More specifically, in a case where the drive system is stopped during traveling of the vehicle, the ECU 300 determines that the request to increase the accelerator operation amount AD1 is made if the difference "d" from the reference accelerator operation amount occurs within a certain time period.

Then, if the accelerator operation amount AD increases, the ECU 300 determines that the user has the intention to keep driving the vehicle. Therefore, the ECU 300 restarts the drive system.

If the restarting request of the user is detected at the time t2, the ECU 300 promptly conducts the re-Ready-ON control at time t3. The ECU 300 detects the restarting request of the user from the change in the accelerator operation amount AD. Therefore, the drive system can be resumed promptly.

Figure 5:
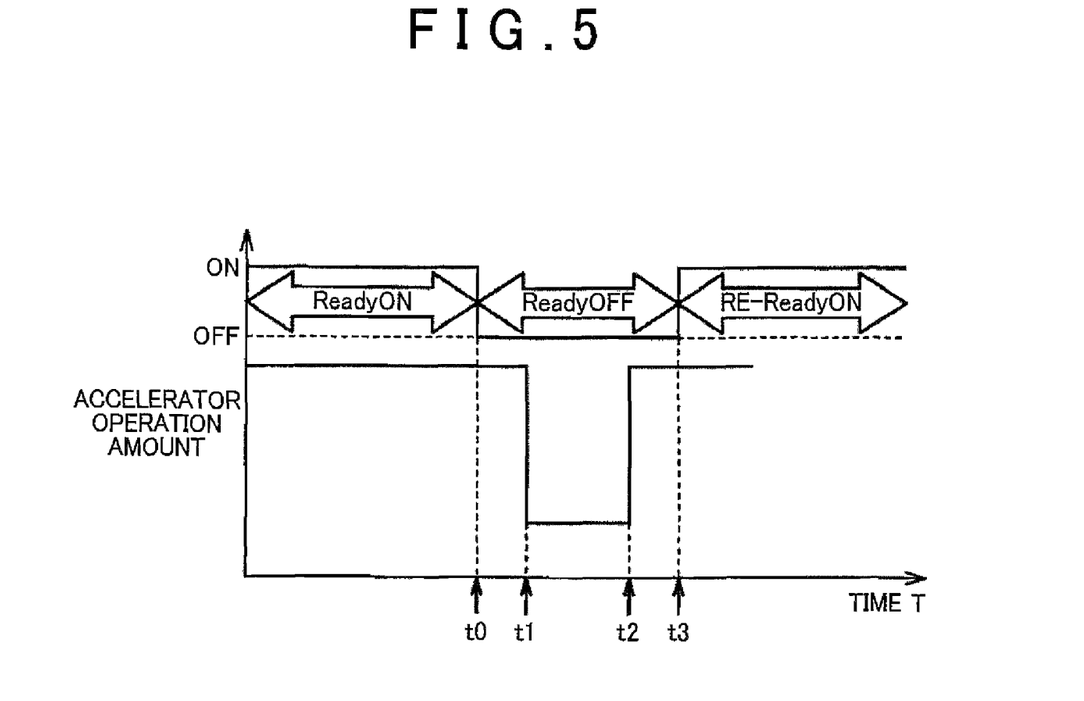
FIG. 5 is a timing chart for illustrating a change in the accelerator operation amount as well as Ready-ON control and Ready-OFF control of the drive system with passage of time T.

FIG. 5 is a timing chart illustrating the change in the accelerator operation amount AD as well as the Ready-ON control and the Ready-OFF control of the drive system with passage of time T.

The hybrid vehicle 100 may occasionally exhibit abnormal behavior during traveling. The abnormal behavior includes a case where the engine 170 cannot be restarted and thus remains being stopped and the like. In this case, the drive torque that is required for desired traveling is not output.

Therefore, during traveling, the drive system needs to be restarted from the Ready-OFF mode and promptly resumed to the Ready-ON mode.

A description will hereinafter be made with reference to FIG. 5. At time t0, the engine 170 is stopped without the intention of the user. Or, the Ready-OFF control is conducted without the intention of the user.

The user notices the abnormal behavior. Then, at time t1, the user releases his/her foot from the accelerator pedal in the accelerator operation section 112. The accelerator pedal is let loose for an OFF operation.

If a foreign object or the like sticks to the accelerator pedal in the accelerator operation section 112, the accelerator pedal gets stuck. Then, the accelerator pedal stays in a position as if it is depressed by the user.

A circumstance where the accelerator operation section 112 remains ON regardless of the user's request to resume is distinguished from the user's request to keep driving.

Due to the above circumstance, the accelerator operation amount sensor 113 detects the accelerator operation amount AD at time t2. The time t2 is a time after a certain time period has elapsed since the time t1. The time t1 is a time at which a reference acceleration value is detected. Then, the ECU 300 determines that the re-Ready-ON control is requested by the user when the detected accelerator operation amount AD exceeds the reference acceleration value.

For example, FIG. 4 shows a case where the accelerator operation amount AD1 does not become lower than a predetermined threshold th1. In this case, there is a possibility that the accelerator pedal cannot return to a position where the accelerator operation amount AD1=0 or a position in a vicinity thereof. This is because the foreign object sticks to the accelerator pedal or the like.

In this case, the reference accelerator operation amount is set high. Then, the system is restarted when the difference "d" becomes equal to or greater than the certain value. The accelerator operation amount AD in this case is also set high because the reference accelerator operation amount AD is set high. Thus, the drive system is started with the large accelerator operation amount AD. Accordingly, the starting torque of the drive system also becomes large. Therefore, the sudden starting or the sudden acceleration of the hybrid vehicle 100 can be expected.

A description will hereinafter be made with reference to FIG. 7. This embodiment focuses on the user's behavior. When noticing the abnormal behavior of the hybrid vehicle 100, the user conducts a re-stepping operation. The abnormal behavior of the vehicle refers to a decrease in a driving force of the drive system or the like. The re-stepping operation refers to operation such as an operation that the user once releases his/her foot from the accelerator pedal in the accelerator operation section 112 and then depresses the accelerator pedal again.

More specifically, if an accelerator operation amount AD2 is not decreased to the predetermined threshold th1 or lower at the time t1 after the Ready-OFF control, the ECU 300 determines that there is a higher possibility that the accelerator pedal in the accelerator operation section 112 is stuck by the foreign object. Therefore, there is no necessity for the re-Ready-ON control of the drive system. Then, a circumstance that the accelerator pedal is stuck by the foreign object is excluded from conditions referred to detect the restarting request.

At the time t2, the ECU 300 determines that the reacceleration request is made based on the change in the accelerator operation amount AD2. The ECU 300 makes this determination in response to that the accelerator operation amount AD2 exceeds the threshold th1 again. The accelerator operation amount AD2 is detected by the accelerator operation amount sensor 113.

Then, at the time t3, the ECU 300 conducts the re-Ready-ON control of the drive system. In other words, the ECU 300 determines that the user has the intention to keep driving the vehicle. When the re-stepping operation is conducted, there is a case that a time period between the time t1 and the time t2 is short. The time t2 is a time when the reacceleration request is detected.

In addition, the ECU 300 can promptly reflect the user's request to keep driving by detecting the re-stepping operation at the time t2. That is, the ECU 300 can conduct the re-Ready-ON control of the drive system promptly at the time t3.

The drive system is restarted before the accelerator operation amount AD2 becomes large. Thus, a restarting torque is suppressed.

Therefore, even when the drive system is brought into the Ready-ON mode again, the drive torque is not applied abruptly. Thus, the sudden starting or the sudden acceleration of the hybrid vehicle 100 can be prevented.

Furthermore, the accelerator operation amount AD2 is smaller at the time t3 than that shown in FIG. 4. The drive system is restarted at the time t3. Therefore, an acceleration shock that is applied to the hybrid vehicle 100 upon the restarting is further reduced.

Moreover, as shown in FIG. 2, the region Y is located between the lower threshold function X1 (VS) and the upper threshold function X2 (VS). The region Y is a region in which the starting of the drive system is allowed.

Accordingly, if the accelerator operation amount AD2 that deviates from the region Y is input at the time t2, the ECU 300 does not conduct the re-Ready-ON control.

In a state where the vehicle speed signal VS indicates the slow vehicle speed, if the accelerator pedal is depressed harder, the accelerator operation amount AD2 exceeds the threshold value th3. That is, the accelerator operation amount AD2 deviates from the region Y. The threshold th3 is obtained by the upper threshold function X2 (VS). However, because the Ready-ON control is prohibited, there is no occurrence of a shock that is caused by the sudden starting or the sudden acceleration.

Figure 6:
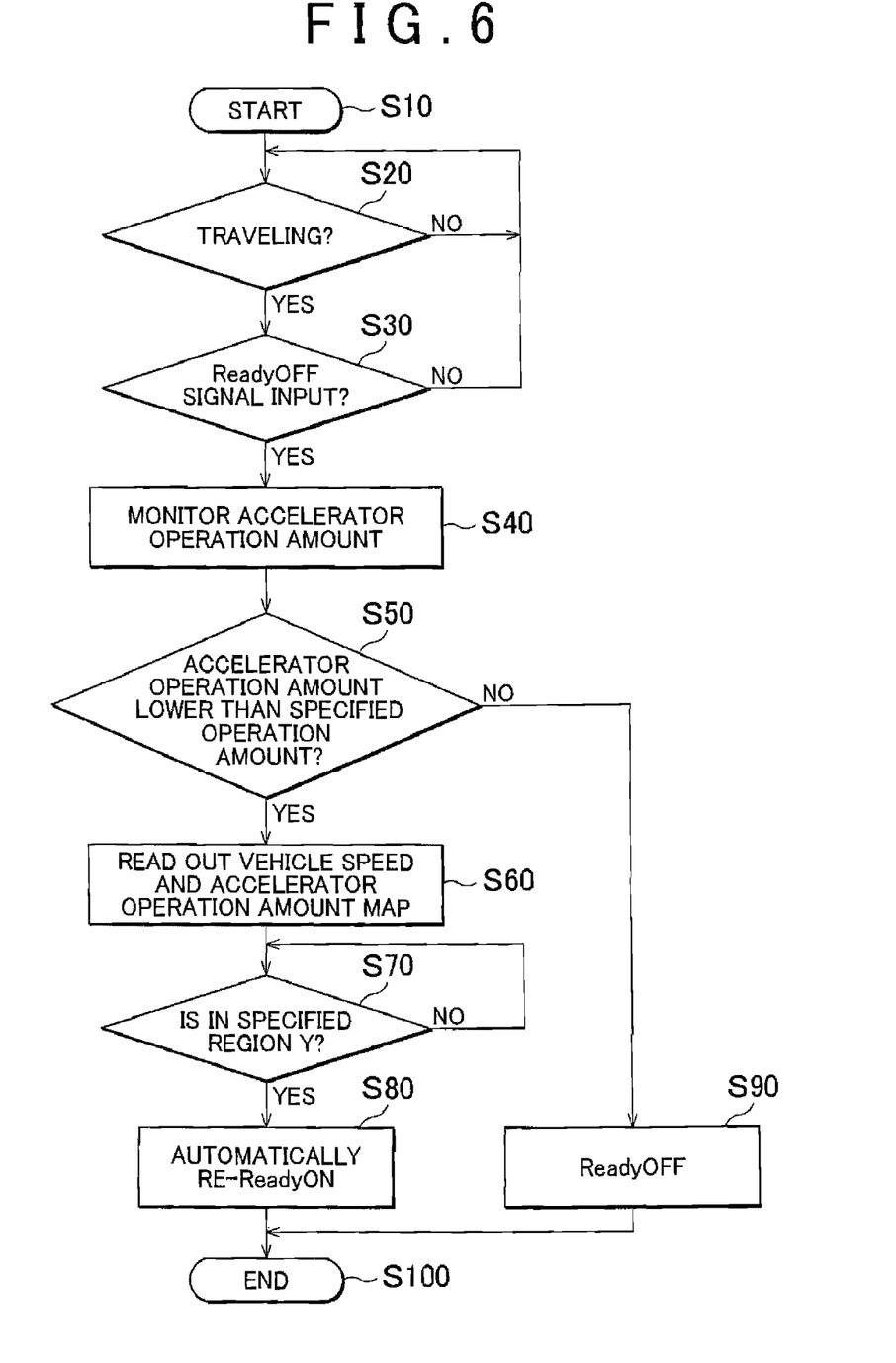
FIG. 6 is a flowchart for describing a flow of processing that is conducted by a control device according to the embodiment.

FIG. 6 is a flowchart for describing a flow of processing that is conducted in the control device according to this embodiment.

At a step S10, the ECU 300 initiates restarting control processing. The ECU 300 reflects the user's intention in this processing. Then, the ECU 300 proceeds to a step S20 in the processing.

At the step S20, the ECU 300 determines whether or not the hybrid vehicle 100 is traveling. The vehicle speed signal VS and the like are used for a determination by the ECU 300. The vehicle speed signal VS is detected by the vehicle speed sensor 111. The vehicle speed signal VS indicates the traveling speed.

If it is determined that the hybrid vehicle 100 is traveling, the ECU 300 proceeds to a next step S30. Alternatively, if it is determined that the hybrid vehicle 100 is not traveling, the ECU 300 repeats the processing at the step S20.

At the step S30, the ECU 300 determines whether or not the Ready-OFF processing is conducted for the drive system in the traveling hybrid vehicle 100.

At the step S30, if it is determined that the drive system is brought into the Ready-OFF mode (YES at the step S30), the ECU 300 proceeds to a next step S40. If it is determined that the drive system is not brought into the Ready-OFF mode (NO at the step S30), the ECU 300 returns the processing to the step S20.

At the step S40, the ECU 300 monitors the accelerator operation amount AD. The accelerator operation amount sensor is output from the accelerator operation amount sensor 113.

Then, the ECU 300 proceeds to a next step S50. At the step S50, the ECU 300 determines whether or not the accelerator operation amount AD becomes a predetermined operation amount or lower.

If the accelerator operation amount AD becomes the predetermined operation amount or lower, the ECU 300 determines that the accelerator pedal is not stuck. As shown in FIG. 7, a case where the accelerator operation amount AD becomes the predetermined operation amount or lower refers to a case where the accelerator operation amount AD is lower than the threshold th1. The accelerator pedal is included in the accelerator operation section 112. Then, the ECU 300 proceeds to a next step S60.

Alternatively, if the accelerator operation amount AD does not become the predetermined operation amount or lower, the ECU 300 determines that the accelerator operation amount AD cannot become lower than the threshold th1 because the foreign object sticks to the accelerator pedal or the accelerator pedal stays in a position.

If the accelerator operation amount AD does not become the predetermined operation amount or lower, the ECU 300 proceeds to a step S90. Then, the ECU 300 maintains the Ready-OFF mode by the Ready-OFF control.

At the step S60, the ECU 300 reads out map information of the region Y, which is according to the vehicle speed signal VS, from the memory section 301. The vehicle speed signal VS indicates the vehicle speed. The vehicle speed signal VS is detected by the vehicle speed signal 111.

Then, the ECU 300 proceeds to a next step S70. At the step S70, the ECU 300 determines whether or not the accelerator operation amount AD is in the predetermined region Y.

If it is determined at the step S70 that the accelerator operation amount AD is in the predetermined region Y, the ECU 300 proceeds to a next step S80.

At the step S80, the ECU 300 conducts the re-Ready-ON control of the drive system. If it is determined at the step S70 that the accelerator operation amount AD is not in the predetermined region Y, the ECU 300 returns the processing to the step S70.

As shown in FIG. 2, the region Y is set in advance to be located between the lower threshold function X1 (VS) and the upper threshold function X2 (VS). The region Y refers to a region in which the drive system according to this embodiment can be started. The region Y is stored as the map information in the memory section 301. As shown in FIG. 2, the upper threshold function X2 (VS) is the monotonically increasing function.

The width (th2 to th3) between the threshold th2 of the lower threshold function X1 (VS) and the threshold th3 of the upper threshold function X2 (VS) gradually changes according to the vehicle speed signal VS at each of the vehicle speeds.

For example, at low speed of the vehicle, a ratio of the drive torque, which is generated upon the restarting of the drive system, to kinetic energy of the hybrid vehicle 100 becomes large. Therefore, a condition for the accelerator operation amount AD is set to have the relatively narrow width of the thresholds (th2 to th3).

Alternatively, at high speed of the vehicle, the ratio of the drive torque, which is generated upon the restarting of the drive system, becomes small. Therefore, the condition for the accelerator operation amount AD results in the relatively wide width of the thresholds (th2 to th3). Accordingly, the drive system can be started with the larger accelerator operation amount AD than that at low traveling speed.

In this embodiment, the lower threshold function X1 (VS) is set as a constant value. In other words, the lower threshold function X1 (VS) does not change according to variations in the vehicle speed signal VS. A region below this constant value is set as the dead region. When the accelerator operation amount AD is in the dead region, the drive system in the Ready-OFF mode is not started.

In FIG. 2, a portion that is located under a line of the lower threshold function X1 (VS) corresponds to the dead region. The lower threshold function X1 (VS) defines a lower edge of the region Y.

In this embodiment, the region Y is set as follows. That is, the width between the thresholds th2 and th3, which is between the upper threshold function X2 (VS) and the lower threshold function X1 (VS), is set to change according to the vehicle speed signal VS at each of the traveling speeds. The region Y is a region for the accelerator operation amount AD in which the drive system can be started. The upper threshold function X2 (VS) gradually increases according to fluctuations in the vehicle speed signal VS. The lower threshold function X1 (VS) remains constant.

Numerical data of the accelerator operation amount AD located in the region Y, which allows the starting of the drive system, is stored in the memory section 301.

The numerical data of the accelerator operation amount AD changes by including different values according to the vehicle speed signal VS. When the traveling speed of the hybrid vehicle 100 increases, the threshold th3 of the upper threshold function X2 (VS) of the accelerator operation amount AD, which allows the starting, gradually increases. Accordingly, the width between the thresholds th2 and th3 increases.

Therefore, when the hybrid vehicle 100 travels at high speed, the accelerator operation amount AD does not exceed the threshold th3 of the upper threshold function X2 (VS) even if the accelerator operation amount AD is large. In this case, the accelerator operation amount AD is in the region Y. The traveling speed of the hybrid vehicle 100 is detected by the vehicle speed sensor 111. Then, the re-Ready-ON control is conducted. When the traveling speed is high, the drive torque, which is generated by the restarting, does not have a significant impact on the hybrid vehicle 100.

As described above, in the vehicle control device according to this embodiment, the map threshold information of the region Y changes according to the vehicle speed signal VS. The region Y is a region that is surrounded by the thresholds th2, th3. Thus, the width of the region Y that allows the restarting of the drive system changes.

Accordingly, in the region Y where a shock caused by acceleration upon the restarting of the drive system is not significant, the drive system can be restarted with the larger accelerator operation amount AD, such as at the high traveling speed, than that at the low traveling speed.

The engine 170 is restarted by the re-Ready-ON control. Then, an electric system is resumed promptly by the electricity generated in the motor generator 110 and the like. Once the drive system is resumed, the whole system including the electric system is resumed. Then, the whole system becomes capable of answering the user's request. At a step S100, the processing to restart the drive system by the ECU 300 ends.

Figure 7:
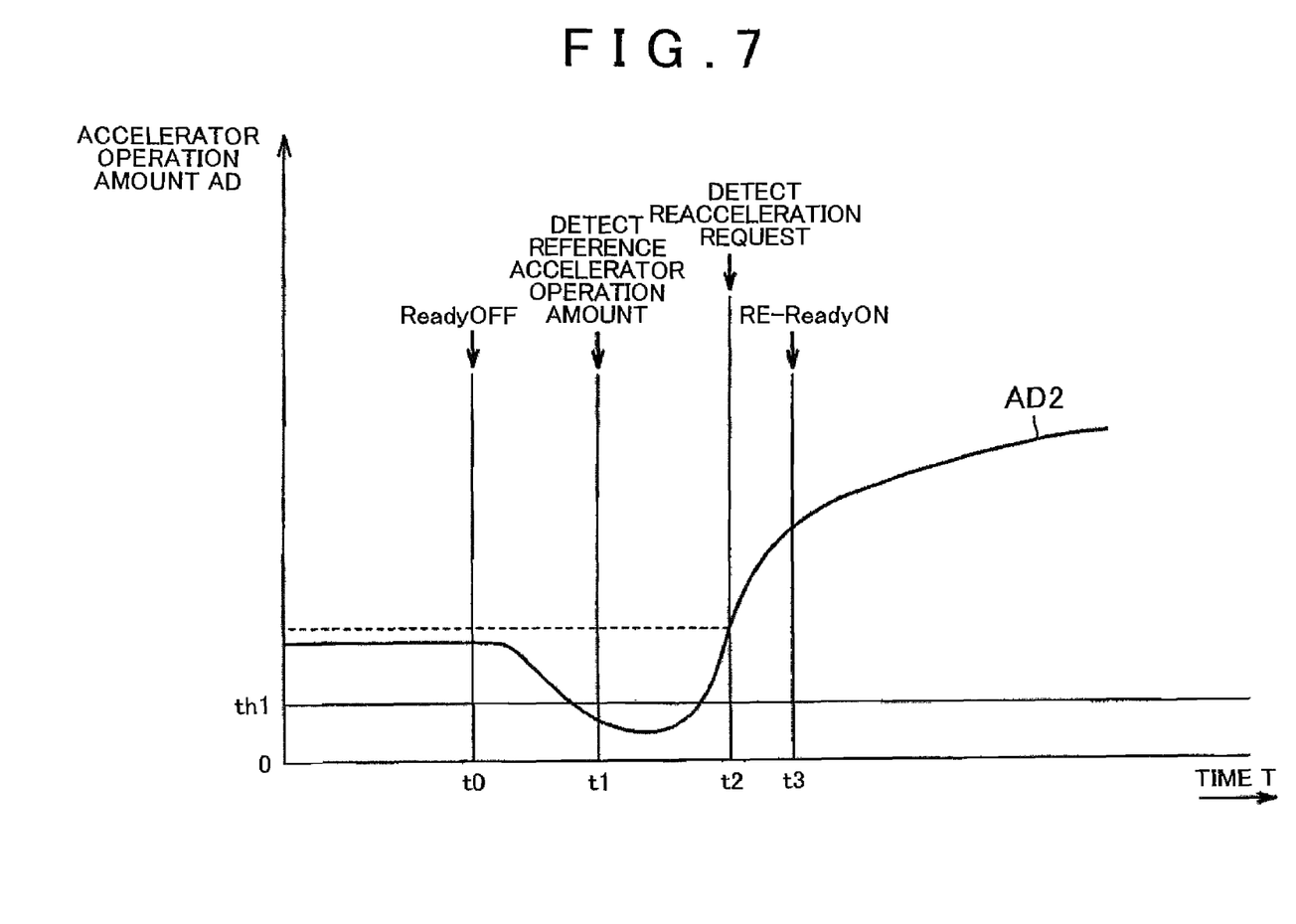
FIG. 7 is a graph that shows how the re-Ready-On control of the drive system is conducted according to an accelerator operation amount AD2 that is decreased once for deceleration.

FIG. 7 is a graph that shows how the re-Ready-ON control of the drive system is conducted by decelerating once. FIG. 7 is a drawing that corresponds to FIG. 4.

A description will hereinafter be made with reference to FIG. 7. As can be seen from the accelerator operation amount AD2, the accelerator pedal is re-depressed. More specifically, the vehicle is accelerated after decelerated once.

This drawing shows that the ECU 300 of the control device conducts the Ready-OFF control of the drive system that is originally in the Ready-ON mode during traveling of the hybrid vehicle 100.

If the change in the accelerator operation amount AD2 is detected while the hybrid vehicle 100 is under the Ready-OFF control, the ECU 300 restarts the drive system at the time t3. The accelerator operation amount AD2 changes according to the operation in the accelerator operation section 112.

Here, the operation is made to decrease and then increase the accelerator operation amount AD2. This is achieved by the operation in the accelerator operation section 112. Accordingly, the user's intention to keep driving is transmitted. When the user shows his/her intention to keep driving by using the accelerator pedal, the user changes the accelerator operation amount AD as follows. The user operates the accelerator pedal to increase and then decrease the operation amount.

When the accelerator operation amount AD of the accelerator operation section 112 becomes lower than the predetermined threshold th1, the reference accelerator operation amount is detected at the time t1.

At the time t2 at which a certain time period has elapsed since the time t1, if the accelerator operation amount AD2 exceeds the predetermined threshold th1 again and becomes larger than the reference accelerator operation amount, which is detected at the time t1, it is determined that the intention to keep driving is confirmed, and the ECU 300 conducts the re-Ready-ON control of the drive system at the time t3.

In this case, the accelerator operation amount AD is increased again within a certain time period from the time t0 at which the Ready-Off control is initiated. Than, the re-Ready-ON control may be conducted.

Alternatively, the re-Ready-ON control may be conducted by detecting a certain operation of the accelerator pedal using the accelerator operation amount sensor 113. The certain operation of the accelerator pedal is detected when the accelerator operation amount AD once becomes smaller than the predetermined threshold th1 and then becomes larger than the predetermined threshold th1 again. In this case, times when the accelerator operation amount AD2 crosses the threshold th1 may differ or may be detected at the same time.

Figure 8:
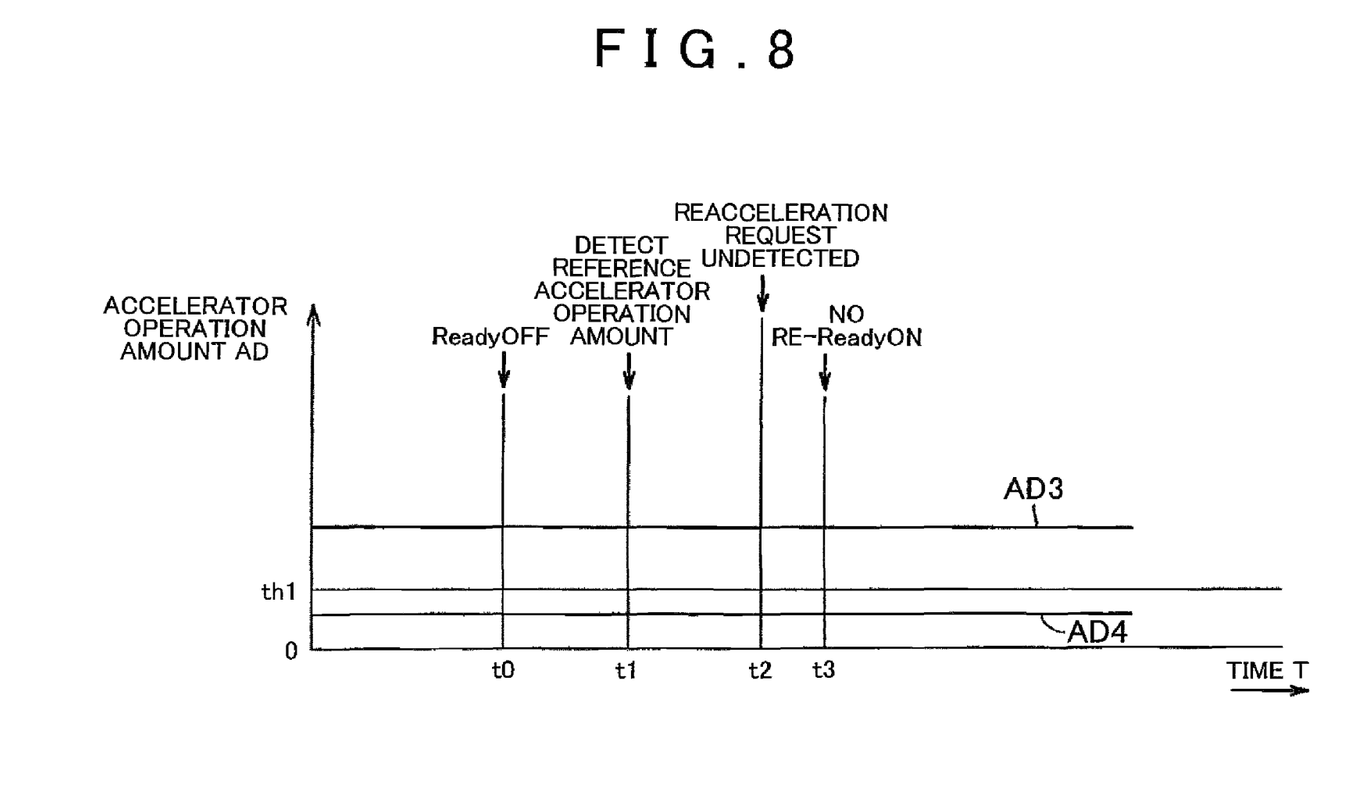
FIG. 8 is a graph that shows a case where accelerator operation amounts AD3, AD4 that are obtained by operation of an accelerator pedal remain constant and thus are not changed.

FIG. 8 is a graph that shows a case where accelerator operation amounts AD obtained by the operation of the accelerator pedal are constant. That is, the accelerator operation amounts AD are not changed. FIG. 8 differs from FIG. 4 in this point.

A description will hereinafter be made with reference to FIG. 8. Accelerator operation amounts AD3, AD4 are constant and thus are not changed. The ECU 300 detects the accelerator operation amount AD3 by the accelerator operation amount sensor 113. The accelerator operation amount AD3 is constantly larger than the predetermined threshold th1.

The ECU 300 also detects the accelerator operation amount AD4 by the accelerator operation amount sensor 113. The accelerator operation amount AD4 is constantly smaller than the predetermined threshold th1.

In such a case, the ECU 300 determines that the accelerator operation amount AD is constantly increased due to the accelerator pedal in the accelerator operation section 112 being stuck by the foreign object or that the accelerator pedal stays in one place. In this case, the user does not show his/her intention to keep driving. Then, a state that no change in the accelerator operation amount AD is detected continues for a certain time period after the time t0 at which the Ready-OFF is made. The accelerator operation amounts AD3, AD4 indicate the state that no change in the accelerator operation amount AD is detected.

In this case, the reference accelerator operation amount remains constant. The reacceleration request is not detected at the time t2. Therefore, the ECU 300 does not conduct the re-Ready-ON control at the time t3.

As described above, the ECU 300 of the hybrid vehicle 100 according to this embodiment does not restart the drive system under a certain circumstance. The certain circumstance refers to a circumstance that the accelerator pedal in the accelerator operation section 112 is stuck by the foreign object and thus remains ON. Alternatively, the certain circumstance refers to a circumstance that the foreign object is fixed to the accelerator pedal and thus the accelerator pedal remains ON. Such circumstances are determined from the accelerator operation amount AD detected by the accelerator operation amount sensor 113.

The ECU 300 detects the change in the accelerator operation amount AD as the user's intention to keep driving. In this case, the ECU 300 can conduct the Ready-ON control of the drive system.

Thus, the user's restarting request can promptly be reflected to the restarting processing by changing determination control of the ECU 300. This can be applied to a control device that includes the existing vehicle speed sensor 111 and the accelerator operation amount sensor 113. Therefore, it is possible to prevent an increase in manufacturing cost because there is no need for additional components.

The ECU 300 of this embodiment promptly restarts the drive system when the drive system is stopped while the hybrid vehicle 100 is traveling and a certain user's request is made. The certain user's request refers to a request to increase the traveling driving force, an acceleration request, or the like. These requests are detected when the accelerator operation amount AD increases. When these requests are detected, the ECU 300 determines that the user has the intention to keep driving the vehicle.

Accordingly, the system is resumed further promptly by reflecting the user's request, even when the vehicle is either traveling or stopped. Therefore, a time period that the hybrid vehicle 100 is under the Ready-OFF control is shortened. During the Ready-OFF control period, it is difficult to control the hybrid vehicle 100.

The user can make the restarting request only by depressing the accelerator operation section 112. In the accelerator operation section 112, the acceleration request of the hybrid vehicle 100 is also made. Thus, a starting procedure is simple. Therefore, the user can conduct the operation in a relaxed mood.

In addition, the operation reduces a chance of error when compared to an operation of a button or the like. The user's posture while driving remains the same. Thus, there is no difficulty in performing the operation. This allows reflecting the user's intention to keep driving to the starting processing of the drive system further easily. Therefore, the system can be resumed promptly.

In the ECU 300 of this embodiment, the restarting of the system is allowed according to the thresholds th2, th3 of the map information. The thresholds th2, th3 of the map information are stored in the memory section 301 in advance. Within the region Y, the shock caused by acceleration upon the restarting does not become significant. The region Y is defined by the thresholds th2, th3 of the map information.

The ECU 300 of this embodiment determines that the Ready-ON condition is met when the accelerator operation amount AD is in the region Y. In the region Y, the accelerator operation amount AD does not exceed the upper threshold function X2 (VS). The upper threshold function X2 (VS) increases according to the vehicle speed signal VS.

In addition, the ECU 300 determines that the kinetic energy of the hybrid vehicle 100 is larger in a high speed area than that in a low speed area. Therefore, the ECU 300 determines that the hybrid vehicle 100 is not significantly influenced by the starting torque.

Then, corresponding to the user's request, the ECU 300 allows the restarting of the drive system in the relatively wider width between the thresholds th2 and th3 in the high speed area than in the low speed area.

Thus, even when the accelerator operation amount AD is large, the drive system can be restarted in the high speed area. Therefore, the system can be resumed promptly.

In the low speed area, the width between the thresholds th2 and th3 are set to be relatively narrow. Therefore, when the accelerator operation amount AD that slightly exceeds the threshold th2 is obtained from the accelerator operation section 112 by the user, the drive system can be started promptly.

When the large accelerator operation amount AD is obtained, the accelerator operation amount AD exceeds the threshold th3. The threshold th3 is derived from the upper threshold function X2 (VS). Accordingly, even if the accelerator pedal in the accelerator operation section 112 is depressed, the drive system is not started. Therefore, it is possible to prevent behavior of the hybrid vehicle 100 that is unintended by the user. The behavior unintended by the user includes the sudden starting, the sudden acceleration, and the like.

Furthermore, the user can promptly restart the drive system through the accelerator operation section 112. This shortens the time period the drive system is in the Ready-OFF mode. Therefore, it is possible to shorten a time period that the user's driving operation is not reflected promptly.

This allows prevention of the erroneous operations as follows. The user notices the abnormal behavior of the vehicle in the Ready-OFF mode while driving the vehicle. Then, the user presses a start switch to attempt restarting the drive system. Accordingly, the user keeps the vehicle 100 under the Ready-OFF control.

Even in such a case where a part or whole of the drive system is stopped due to the Ready-OFF control that is unintended by the user or engine stop, the drive system is restarted by simply showing the user's intention to keep driving. In addition, the user can show his/her intention to keep driving by the simple increasing or decreasing operation. The simple increasing or decreasing operation refers to an operation like depressing the accelerator operation section 112 again. Then, as described above, the system can be resumed to a state that the vehicle can keep traveling smoothly.

Especially during traveling of the vehicle, the system is smoothly resumed by conducting the increasing or decreasing operation with the accelerator operation section 112, which is presented as the user's intention to keep driving and is also similar to the accelerating or decelerating operation that the user usually conducts while driving the vehicle. Therefore, the behavior of the hybrid vehicle 100 that is unintended by the user is less likely to occur. The behavior of the hybrid vehicle 100 that is unintended by the user refers to the sudden acceleration or the sudden deceleration of the hybrid vehicle 100 during traveling. The user thus can keep driving with his/her own intention.

In addition, it is possible to adjust the size of the dead region that corresponds to the amount of the play of the accelerator operation section 112. An adjustment is made by changing the threshold th2. The threshold th2 is derived from the lower threshold function X1 (VS).

This threshold th2 is not particularly limited to such a constant value. For example, the threshold th2 may satisfy a following equation: th2=0. Alternatively, the threshold th2 may be a value that is derived from another function that changes according to the vehicle speed signal VS and the like.

In addition to or independently from the upper threshold function X2 (VS), which is the monotonically increasing function, it is possible with this lower threshold function X1 (VS) to change the region Y that allows starting of the drive system and the width between the thresholds th2 and th3, each of which changes according to the vehicle speed signal VS; therefore, the vehicle has a good corresponding property.

The threshold th2 is set as the lower threshold function X1 (VS). The threshold th3 is set as the upper threshold function X2 (VS). The upper threshold function X2 (VS) is the monotonically increasing function. The thresholds th2, th3 are obtained according to the vehicle speed signal VS. However, the lower threshold function X1 (VS) and the upper threshold function X2 (VS) are not limited to the above-mentioned functions.

For example, either the lower threshold function X1 (VS) or the upper threshold function X2 (VS) may be a linear function, a quadratic function, an exponential function, or the like that gradually increases according to the traveling speed. Also, the lower threshold function X1 (VS) and the upper threshold function X2 (VS) may have a region whose area is partially reduced. The lower threshold function X1 (VS) and the upper threshold function X2 (VS) may lead to any of the thresholds th2, th3 as long as the lower threshold function X1 (VS) and the upper threshold function X2 (VS) increase or decrease the area of the region according to the vehicle speed signal VS or keeps the area of the region constant.

The vehicle speed signal VS is a variable of the lower threshold function X1 (VS) and the upper threshold function X2 (VS). The upper threshold function X2 (VS) is the monotonically increasing function. The vehicle speed signal VS closely matches the actual vehicle speed. However, the variable is not limited to the vehicle speed signal VS that can be obtained by detecting the rotational speed of the drive shaft and the like. The rotational speed of the drive shaft and the like is detected by the vehicle speed sensor 111. The drive shaft rotatively supports the drive wheel 160.

For example, the vehicle speed signal VS may be a vehicle speed signal that is obtained from the rotational speed of another wheel or the drive wheel 160. The vehicle speed signal VS may be another signal that corresponds to the vehicle speed. Another signal that corresponds to the vehicle speed indicates the traveling speed of the hybrid vehicle 100. Any kind of signal may be used as the variable of the lower threshold function X1 (VS) and the upper threshold function X2 (VS).

Lastly, the embodiment that has been described above is reviewed with reference to the drawings. A description will hereinafter be made with reference to FIG. 1. The control device according to this embodiment includes the drive system, the accelerator operation section 112, and the ECU 300. The control device restarts the system which controls the traveling driving force. The accelerator operation section 112 inputs the accelerator operation amount AD. The accelerator operation amount AD determines the traveling driving force of the drive system. The ECU 300 controls the drive system according to the accelerator operation amount AD. The ECU 300 detects the change in the accelerator operation amount AD that is made by the accelerator operation section 112. Then, the ECU 300 starts the drive system.

If the drive system is stopped during the traveling of the hybrid vehicle 100, the ECU 300 detects the change in the accelerator operation amount AD that is made by the accelerator operation section 112. Then, the ECU 300 restarts the drive system.

Accordingly, the user's restarting request is reflected to the restarting processing through the accelerator operation section 112. Therefore, the drive system can be resumed promptly.

When receiving the driver's traveling intention, the ECU 300 starts the drive system. The traveling intention is transmitted when the user increases the accelerator operation amount AD by the accelerator operation section 112.

Furthermore, when the user depresses the accelerator operation section 112 again, the ECU 300 determines that the traveling intention is made to increase the accelerator operation amount AD. Thus, the ECU 300 restarts the drive system.

The control device of the vehicle further includes the vehicle speed sensor 111. The vehicle speed sensor 111 detects the traveling speed of the hybrid vehicle 100. The ECU 300 starts the drive system based on the threshold map in accordance with the traveling speed and the accelerator operation amount AD. The traveling speed is detected by the vehicle speed sensor 111. The accelerator operation amount AD is detected by the accelerator operation amount sensor 113. The threshold map indicates the relation between the vehicle speed signal VS and the accelerator operation amount AD. The relation between the vehicle speed signal VS and the accelerator operation amount AD is set in advance.

In the threshold map, the width of the accelerator operation amount AD that allows the starting of the drive system changes according to the vehicle speed signal VS. The width of the accelerator operation amount AD that allows the starting of the drive system is between the thresholds th2 and th3 in FIG. 2.

The control device further includes the accelerator operation amount sensor 113. The accelerator operation amount sensor 113 is provided in the accelerator operation section 112. The accelerator operation amount sensor 113 detects the accelerator operation amount AD. Then, the accelerator operation amount sensor 113 sends the detected accelerator operation amount AD to the ECU 300.

The vehicle speed sensor 111 is provided in the control device. The vehicle speed sensor 111 detects the traveling speed of the hybrid vehicle 100.

The ECU 300 restarts the drive system based on the numerical data of the accelerator operation amount AD, which is located in the region Y, and which allows the starting of the drive system. The region Y is in the threshold map which is set in advance according to the vehicle speed signal VS of the traveling speed detected by the vehicle speed sensor 111.

Compared to the case where the traveling speed is low, even with the large accelerator operation amount AD that is obtained such as when the traveling speed is high, the shock caused by the acceleration upon the restarting of the drive system does not become large in the region Y where the system can be restarted.

The ECU 300 changes the value of the accelerator operation amount AD that allows the starting of the drive system according to the vehicle speed signal VS. Then, the ECU 300 sends the threshold map to the memory 301 and stores it therein.

In this embodiment, the description is made on the configuration in which the turning angle of the accelerator operation section 112 is output as the accelerator operation amount AD. The turning angle changes according to the depressing operation of the accelerator pedal. The accelerator operation amount AD is detected by using the accelerator operation amount sensor 113.

However, in this embodiment, the ECU 300 may receive a signal that indicates the acceleration request. The intention to keep traveling can be confirmed with the acceleration request. The intention to keep traveling is indicated by the operation of the accelerator pedal. The acceleration request is not limited to the reacceleration request. The detecting sensor is not limited to the accelerator operation amount sensor 113. The accelerator operation amount sensor 113 detects the accelerator operation amount AD. The detecting sensor can be any type of sensor.

For example, the accelerator operation section 112 may be a manual switch. The user inputs the accelerator operation amount AD by the accelerator operation section 112. The manual switch is a throttle lever or the like. The accelerator operation section 112 may be an input section of an automatic speed control device or the like.

The accelerator operation amount AD is used in this embodiment. The accelerator operation amount AD corresponds to a throttle signal of the engine 170. Accordingly, in this embodiment, the system can be restarted only when the accelerator operation amount AD, which changes according to the vehicle speed sensor VS, is detected.

Therefore, even in a vehicle that primarily uses the electric system, the electric system can be restarted before the engine is restarted. The electric system may be restarted instead of starting the engine. The vehicle that primarily uses the electric system is an electric motor vehicle and the like. Thus, the vehicle that primarily uses the electric system may be a vehicle that does not need or is less likely to need to start the engine. The vehicle that does not need or is less likely to need to start the engine includes a hybrid vehicle, a plug-in hybrid vehicle, an electric vehicle, and the like.

Furthermore, FIG. 1 shows an exemplary configuration in which two motor generators are provided. However, the number of motor generator is not limited to two, and one motor generator or more than two motor generators may be provided.

In this embodiment, the description has been made on the configuration in which the ECU 300 restarts the drive system according to the accelerator operation amount AD when the traveling hybrid vehicle 100 is in the Ready-OFF mode. However, the configuration is not particularly limited to the above. For example, the drive system may be brought under the Ready-ON control and then started only when the vehicle is stopped and thus the vehicle speed is 0 km/h.

As shown in FIG. 2, even in the state that the hybrid vehicle 100 is stopped, the user can start the drive system in the region Y. The state that the hybrid vehicle 100 is stopped refers to a state that the speed of the hybrid vehicle 100 is 0 km/h. The drive system is started by using the accelerator pedal in the accelerator operation section 112 to change the accelerator operation amount AD. Therefore, the user can smoothly start driving the hybrid vehicle 100 from the state that the hybrid vehicle 100 is stopped.

Furthermore, as shown in FIG. 2, the dead region exists until the accelerator operation amount AD reaches the threshold th2 of the lower threshold function X1 (VS). Therefore, when the accelerator pedal in the accelerator operation section 112 is not depressed further and thus the user's foot is lightly placed on the accelerator pedal, the ECU 300 does not start the drive system.

Moreover, when the accelerator operation amount AD exceeds the threshold th3 of the upper threshold function X2 (VS), the ECU 300 does not start the drive system.

When the user provides the large accelerator operation amount AD, the accelerator operation amount AD easily exceeds a lowest point on a curve of the threshold th3. The curve of the threshold th3 is defined by the upper threshold function X2 (VS). Thus, the accelerator operation amount AD is deviated from the region Y.

Accordingly, when the vehicle is stopped (the vehicle speed is 0 km/h), the drive system is not started unless the user lightly depresses the accelerator pedal in the accelerator operation section 112 as the user's intention to start driving.

Therefore, it is possible to prevent the sudden starting of the hybrid vehicle 100 from a halt. In addition, starting restriction control may be further added to restrict the starting of the drive system unless a foot brake (not shown) is depressed.

The embodiment disclosed herein is given as a mere illustration in all respects, but not given to impose any limitation. The scope of the present invention is not defined by the above descriptions but defined by the appended claims, and all changes which come within the meaning and range of equivalency of the claims are to be embraced within their scope.

What is claimed is:

1. A control system for a vehicle comprising:
a drive system that includes a motor generator and an engine, the drive system outputs a driving force for a vehicle;
an accelerator operation sensor that detects an operation amount of an accelerator; and
an electronic control unit that is configured to:
control the driving force output by the drive system, in accordance with the detected operation amount of the accelerator; and
start at least one of the motor generator and the engine of the drive system when a change in the operation amount of the accelerator is detected by the accelerator operation sensor in a state that the drive system stops while the vehicle is traveling.

2. The control system for a vehicle according to claim 1, wherein
the electronic control unit is configured to restart at least one of the motor generator and the engine of the drive system when a difference between a first operation amount of the accelerator at a first time under a condition wherein the drive system stops while the vehicle is traveling, and a second operation amount of the accelerator at a second time which is a time after a predetermined time period has elapsed since the first time becomes equal to or greater than a predetermined value.

3. The control system for a vehicle according to claim 1, wherein
the electronic control unit is configured to restart at least one of the motor generator and the engine of the drive system when a user's intention to increase the traveling driving force is detected in accordance with the change in the operation amount of the accelerator operated by the accelerator operation section.

4. The control system for a vehicle according to claim 1, wherein
the electronic control unit is configured to restart at least one of the motor generator and the engine of the drive system when the accelerator operation section is operated to reduce the operation amount of the accelerator so that the operation amount of the accelerator becomes below a threshold value and then the accelerator operation section is operated to increase the operation amount of the accelerator so that the operation amount of the accelerator become above the threshold value.

5. The control system for a vehicle according to claim 1, wherein
the accelerator operation sensor detects the operation amount of an accelerator pedal which pressed by a user to operate the accelerator, and the electronic control unit is configured to restart at least one of the motor generator and the engine of the drive system when the accelerator pedal is re-depressed by the driver.

6. The control system for a vehicle according to claim 1, further comprising
a vehicle speed sensor that detects a traveling speed of the vehicle,
wherein
the electronic control unit is configured to restart at least one of the motor generator and the engine of the drive system based on the traveling speed detected by the vehicle speed sensor and a threshold map that is set in advance and shows a relation between the traveling speed and the accelerator operation amount.

7. The control system for a vehicle according to claim 6, wherein
the threshold map is stored in a manner that the operation amount of the accelerator used for determining when at least one of the motor generator and the engine of the drive system is started, varies in accordance with the traveling speed.

8. The control system for a vehicle according to claim 7, wherein
the electronic control unit is configured to restart at least one of the motor generator and the engine of the drive system when the operation amount of the accelerator is in a predetermined region that is set in advance in the threshold map.

9. The control system for a vehicle according to claim 8, wherein
the electronic control unit is configured not to allow the restart of at least one of the motor generator and the engine of the drive system even when the change in the operation amount of the accelerator is detected, when the operation amount of the accelerator is outside the predetermined region that is set in advance in the threshold map.

10. A control method for a vehicle, comprising:
detecting that a drive system stops while a vehicle is travelling, the driving system includes a motor generator and an engine;
detecting an operation amount of an accelerator;
reading out a threshold map that is set in advance and shows a relation between a traveling speed of the vehicle and the operation amount of the accelerator;
determining whether or not the operation amount of the accelerator is in a predetermined region that is set in advance in the threshold map; and
restarting at least one of the motor generator and the engine of the drive system when the operation amount of the accelerator is in the predetermined region that is set in the threshold map.

\* \* \* \* \*